Dec. 3, 1963  T. J. SULLIVAN  3,112,876
TWO-STAGE VALVE HAVING FLOATING SWITCHES
Filed Aug. 25, 1960  4 Sheets-Sheet 1
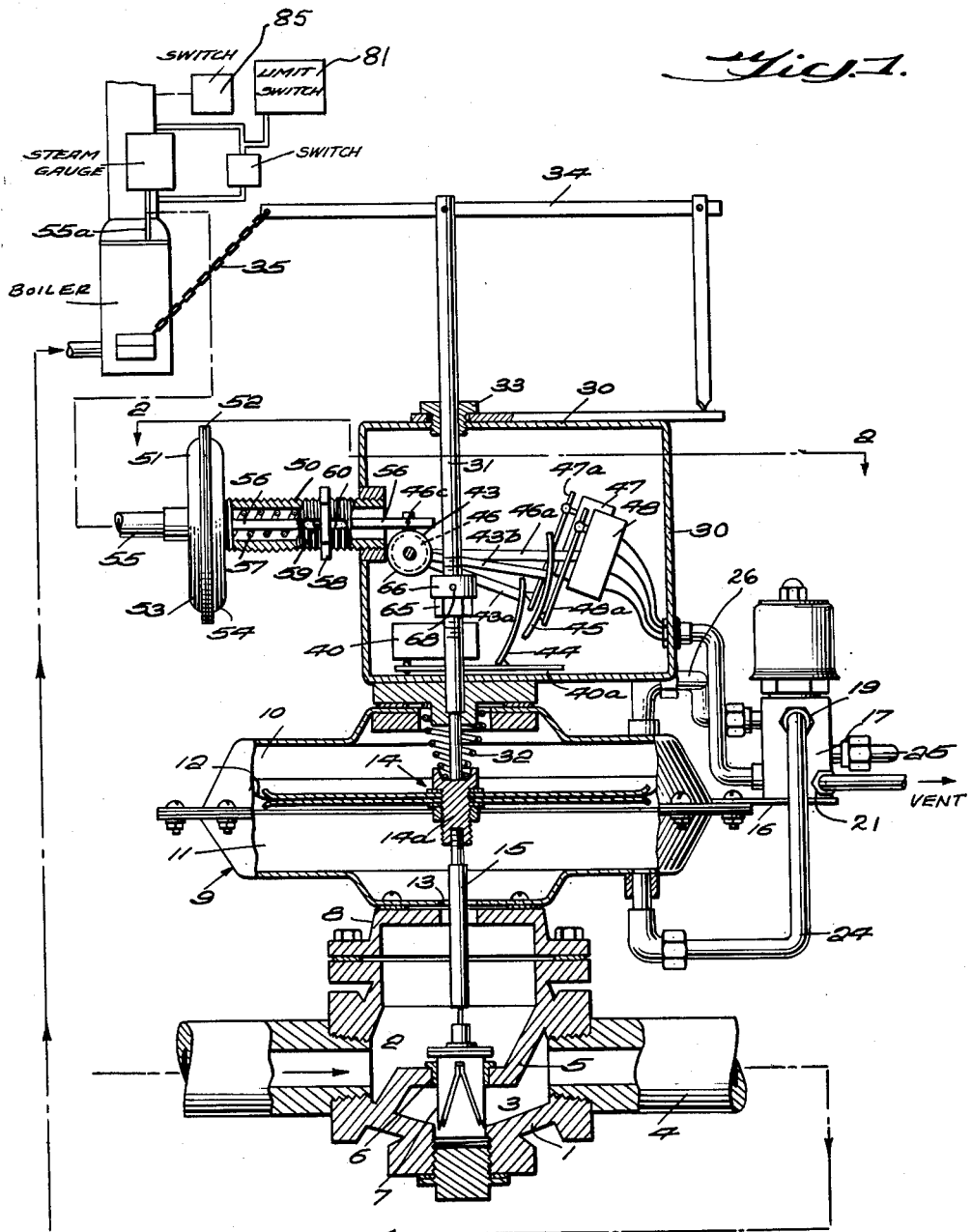
INVENTOR
Timothy J. Sullivan
BY Peirce, Scheffler & Parker
ATTORNEYS

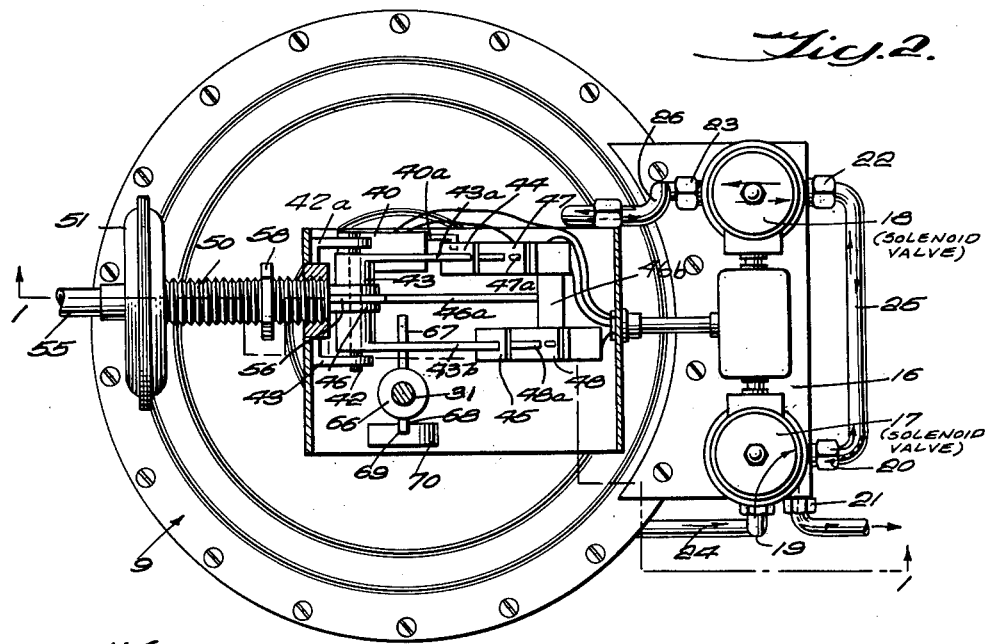

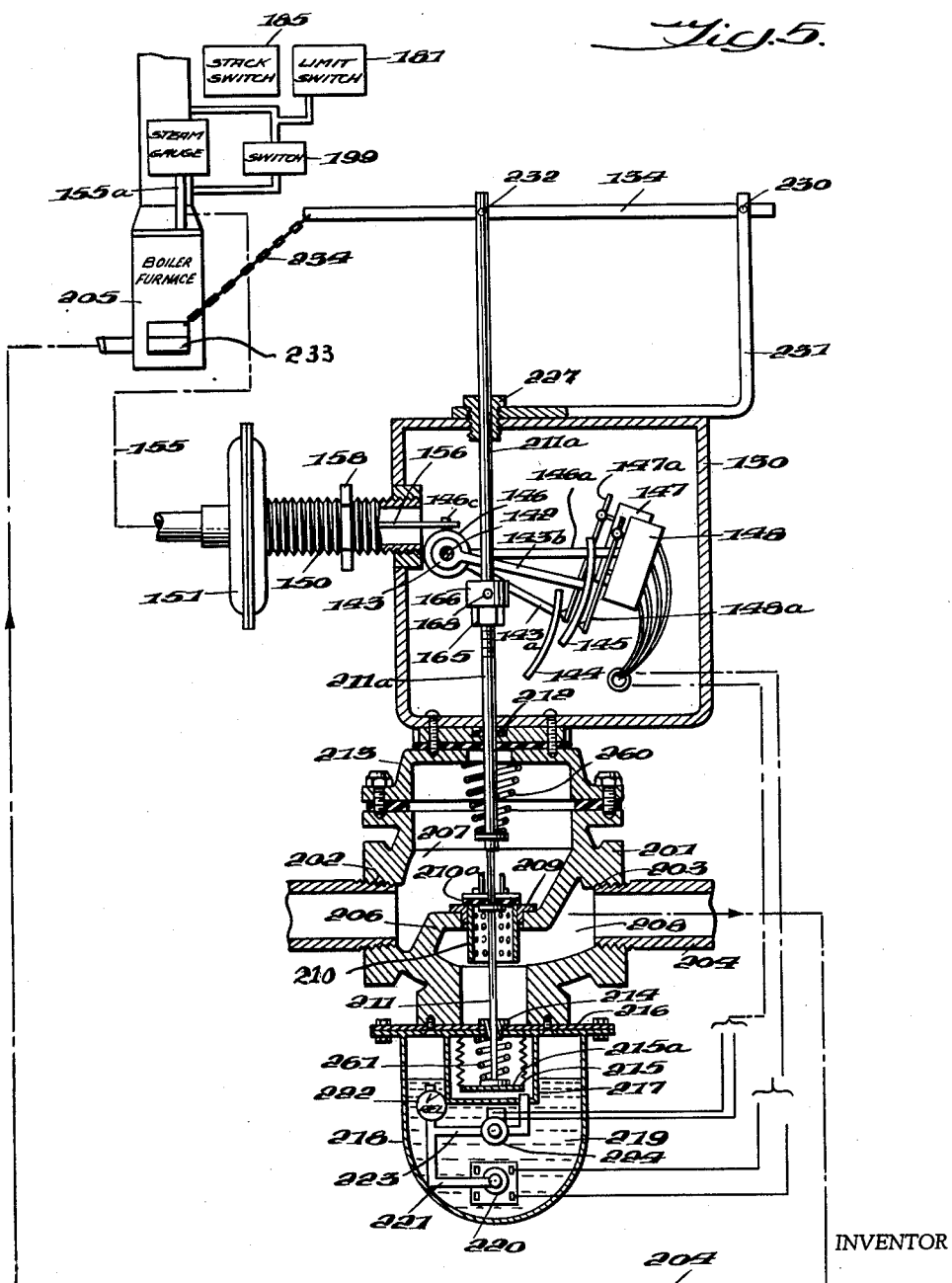

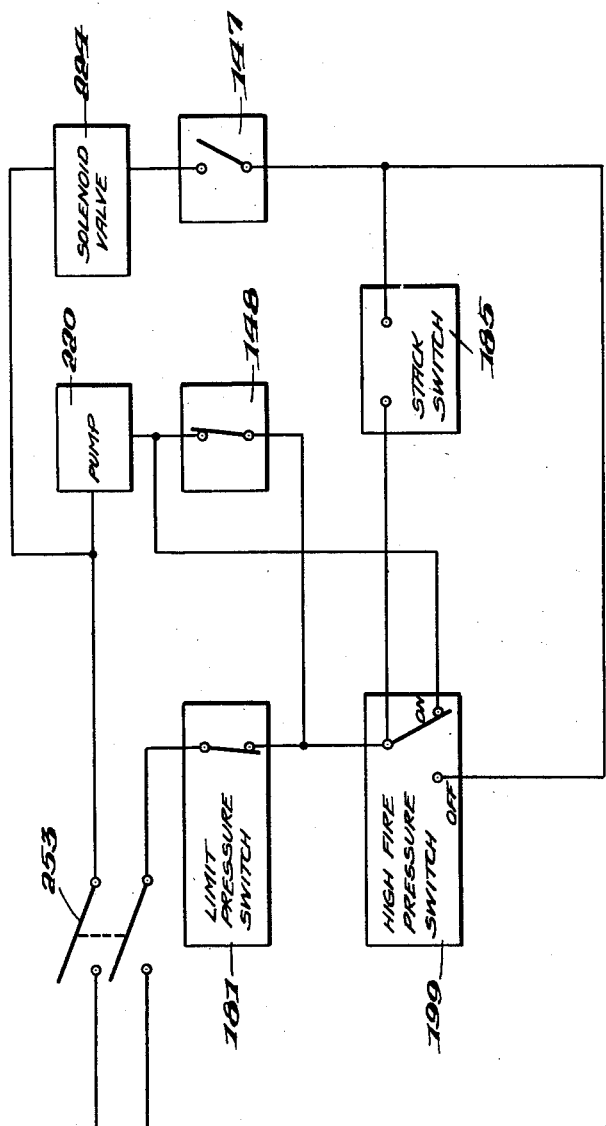

United States Patent Office 3,112,876
Patented Dec. 3, 1963

3,112,876
TWO-STAGE VALVE HAVING
FLOATING SWITCHES
Timothy J. Sullivan, Butte, Mont., assignor to Sullivan Valve and Engineering Company, Butte, Mont., a corporation of Montana
Filed Aug. 25, 1960, Ser. No. 54,562
11 Claims. (Cl. 236—1)

This invention relates generally to a two-stage fluid control valve, and more particularly to a two-stage fuel gas control valve of either the single diaphragm operated or the hydromotor operated type which is automatically regulatable as a function of the temperature or pressure of a fluid which is heated by a gas burner.

The present application is a continuation-in-part application of my prior U.S. application Ser. No. 843,461 filed September 30, 1959 (abandoned November 21, 1960). The present invention is an improvement over the apparatus disclosed in my earlier-filed U.S. patent application Ser. No. 691,362, filed October 21, 1957 (now Patent No. 2,973,935), entitled "Two-Stage Single Diaphragm Valve," and application Ser. No. 9,636 filed February 18, 1960, now Patent No. 3,051,432, and entitled "Two-Stage Hydromotor-Operated Valve."

It is well known in the prior art to provide two-stage valves which will open to a first low-fire position to cause a limited amount of fuel gas to be supplied to the burner to heat the furnace flue sufficiently to create a draft therethrough, and which will then open to a fully-open high-fire position to permit a maximum supply of fuel to the burner.

In many applications of the two-stage fluid control valve it is desirable that the high-fire operation of the valve be automatically regulated as a function of the temperature or pressure of the fluid heated by the gas burner. Thus it is desirable that the degree of opening of the valve member relative to its seat and consequently the degree of flow of gas through the supply line be automatically regulated as a function of the physical properties (pressure or temperature) of the heated fluid.

The primary object of my invention is to provide a two-stage gas control valve having means for automatically regulating the degree of opening of the valve upon high-fire operation in accordance with variation in the temperature or pressure of the heated fluid.

A further object of my invention is to provide a two-stage valve—of either the single-diaphragm pressure motor operated type or the hydromotor operated type—having floating switch means operable as a function of the fluid to be heated for automatically adjusting the high fire position of the diaphragm or, hydromotor, as the case may be, and the valve element secured thereto.

A more specific object of my invention is to provide two-stage valve control means having floating control switches mounted upon a carrier element which is movable as a function of the pressure or temperature of the heated fluid, said switches being operable by cam means which are movable as a function of the movement of the valve member relative to its seat.

Other objects and advantages of my invention will become more apparent from a study of the following specification when considered in conjunction with the accompanying drawings in which:

FIG. 1 is a sectional view of a single-diaphragm-operated steam pressure responsive embodiment of the invention taken along line 1—1 of FIG. 2, the elements being shown in their positions for minimum steam pressure;

FIG. 2 is a sectional view taken along line 2—2 of FIG. 1;

FIG. 3 is a wiring diagram of the electrical circuit of the system in its initial de-energized condition;

FIG. 4 is a generally diagrammatic sectional view of a temperature-responsive embodiment of the invention;

FIG. 5 is a sectional view of a hydromotor-operated pressure responsive embodiment of the invention; and FIG. 6 is an electrical schematic of the hydromotor operated valve of FIG. 5.

Referring first more particularly to FIGS. 1 and 2, the valve body 1 has an inlet chamber 2 and an outlet chamber 3 connected in series with the gas burner supply main 4. The transverse wall 5 having the valve seat 6 therein divides the inlet and outlet chambers. Valve member 7 movably mounted within the valve body is adapted to be seated upon the valve seat 6 as shown to close the passage through the valve. While I have illustrated the valve as being of the globe type, it will be apparent that the invention is applicable to various other types of valves, such as full-flow valves and the like.

The valve body has a bonnet 8 to which is secured the pressure motor housing 9 divided into an upper chamber 10 and a lower chamber 11 by the flexible diaphragm 12. The lower chamber 11 is in communication with the inlet chamber 2 through the opening 13 in the upper part of the bonnet. The diaphragm 12 carries a diaphragm plate assemblage 14 which is connected to the valve member 7 by means of the arm 15 extending through the opening 13.

A plate 16 secured to the diaphragm housing 9 supports a three-way solenoid valve 17 and a two-way solenoid valve 18. These solenoid valves are of the type illustrated in my prior U.S. Patent No. 2,812,770 issued November 12, 1957. The three-way valve 17 has an inlet 19, a first outlet 20, and a second outlet 21, said second outlet being connected to an atmospheric vent. The two-way solenoid valve has an inlet 22 and an outlet 23. The lower diaphragm chamber 11 is connected to the inlet of the three-way valve 17 by conduit 24, and the first outlet of the three-way valve is connected to the inlet 22 of the two-way valve by the conduit 25. The outlet 23 of the two-way valve is connected to the upper diaphragm chamber 10 by the conduit 26.

When the three-way solenoid valve is in the de-energized state, the inlet 19 is in communication with the first outlet 20 and when the two-way solenoid valve is in the de-energized state the inlet 22 is in communication with the outlet 23. The lower diaphragm chamber 11 thus is in communication with the upper diaphragm chamber 10 through the conduits 24, 25 and 26; since the pressure in the lower chamber 11 equals the pressure in the upper chamber 12, no movement of the diaphragm will occur upon the building-up of fuel gas pressure in the valve inlet chamber 2.

Secured to the upper portion of the pressure motor housing 9 is the switch casing 30. Slidably mounted in the switch casing 30 is the operating stem 31. The lower end of the stem 31 extends into the pressure motor upper chamber 10 and abuts at its lower extremity the bottom surface of a recess in the head of the bolt 14a of the diaphragm plate assemblage 14. Spring 32 mounted concentrically about the lower end of the stem within the upper chamber 10 is contiguous at its upper end with the pressure motor housing and is secured at its lower end to the stem, thus tending to bias the stem downwardly into engagement with the recess in bolt 14a. It is apparent that the cooperation between the stem and the bolt 14a will be a "floating" or free connection. At its upper end the stem extends through a guide bushing 33 of the switch casing 30 and is connected to the operating lever 34. Chain 35 connected to the lever may be utilized, as is customary in the art, for the mechanical control of auxiliary apparatus, such as the secondary air doors of an associated gas-fired furnace as shown in FIG. 1.

Fixedly secured within the switch casing 30 is the stationary switch 40 having an actuating member 40a. The contacts of switch 40 are normally closed.

A supporting shaft 42 is secured at its ends to fixed casing supports 42a. Rotatably mounted upon shaft 42 is the unitary U-shaped member 43 having legs 43a and 43b. Cam element 44 is secured to the free extremity of leg 43a and cam element 45 is secured to the free extremity of leg 43b. Rotatably mounted upon the cylindrical transverse portion of the U-shaped member 43 is the floating switch carrier element 46 having an arm portion 46a. Secured to the end 46b of the arm 46a are the floating switches 47 and 48 having switch actuating members 47a and 48a, respectively. The contacts of switch 47 are normally open and the contacts of switch 48 are normally closed.

Rigidly mounted at one end in an opening in the switch casing 30 is the tubular element 50 which is threaded on its outer periphery. At the free extremity of tubular element 50 is secured a diaphragm housing 51 which is divided by diaphragm 52 into chambers 53 and 54. Conduit 55 provides communication between the diaphragm chamber 53 and a fluid pressure line 55a of the boiler system. Slidably mounted within the tubular member 50 is the floating switch carrier position control rod 56 which is secured at one end to diaphragm 52 and is pivotally connected at the other end to a projection 46c of the transverse portion of the floating switch carrier element 46.

Spring 57 mounted concentrically about rod 56 within the tubular member 50 tends to bias position control rod 56 to the left in FIG. 1 and thus pivot floating switch carrier 46 in the counter-clockwise direction to the elevated position shown in the figure. The tension of spring 57 may be adjusted by means of the nut 58 threadably mounted upon tubular member 50, which nut cooperates with spring pin 59 which extends through a slot 60 in the wall of the tubular member.

It is apparent that when the fluid pressure in line 55a is relatively low, the floating switches 47 and 48 will be biased by spring 57 to the elevated position shown. As the pressure in line 55a and diaphragm chamber 53 builds up, the diaphragm 52 will flex to the right and longitudinally displace position control rod 56 to the right to pivot the floating switch carrier 46 in the clockwise direction to lower the floating switches 47 and 48. Since carrier 46 is freely rotatable upon the cylindrical transverse portion of U-shaped member 43, longitudinal movement of position control rod 56 and corresponding pivotal movement of carrier 46 will not affect the angular position of the U-shaped member 43.

Threadably secured to the operating stem 31 is the adjusting nut 65 which supports at its upper surface the sleeve 66 which is slidably mounted upon stem 31. As shown in FIG. 2, the sleeve 66 has a pin 67 extending radially outwardly therefrom beneath the arm 43b of the U-shaped element 43. As will be explained in greater detail below, as the diaphragm 12 and stem 31 move upwardly, pin 67 will cooperate with the lower surface of arm 43b to move the U-shaped member upwardly to cause cams 44 and 45 to actuate switch operators 47a, 48a, respectively. Similarly downward movement of stem 31 will result in downward movement of the U-shaped member 43.

In order to prevent the sleeve member 66 from rotating on stem 31, a second pin 68 extends radially outwardly from the sleeve diametrically opposite from the pin 67. The pin slidably extends within the vertical guide slot 69 of the stationary casing element 70.

Upon vertical movement of diaphragm 12, stem 31, sleeve 66 and pin 67, the cam element 44 of arm 43a of the U-shaped member is caused to come into engagement with the switch operating member 47a of switch 47 and the switch operating member 40a of switch 40. The cam element 45 of arm 43b of the U-shaped member is arranged to come into engagement with the operating member 48a of switch 48.

Referring now to FIG. 3, electrical power is fed from the power supply mains, through the limit control switch 81 and through the branches 82 and 83 of the parallel network. Branch 82 includes the normally open floating switch 47 connected in series with the solenoid of the two-way valve 18, and branch 83 includes the normally closed switch 48 connected in series with the solenoid of three-way valve 17. Shunted across the switch 47 is the branch 84 which includes the temperature operated switch 85 connected in series with the stationary switch 40 which is secured to the switch casing. As shown in FIG. 1, the switch 85 is operated in accordance with the stack temperature of the furnace. The contacts of switch 85 are normally closed and will be opened only when the stack temperature has reached a desired value.

The operation of the two-stage single-diaphragm valve may now be described.

Assuming that the system is in the de-energized state with the double pole switch 86 open, the two-way and three-way solenoid valves 18 and 17 will be de-energized and the pressure in the upper and lower diaphragm chambers 10 and 11, respectively, will be equalized through conduits 24, 25 and 26 as shown by the solid arrows in FIG. 2. Consequently, no movement of diaphragm 12 will result upon building up of fuel gas pressure in the valve inlet chamber 2. The contacts of switch 47 are in their normally-open state and the contacts of switch 48 are in their normally-closed state. However, the normally-closed contacts of stationary switch 40 are held in an open state by the cam 44 of FIG. 1.

To initiate operation of the system, the double pole switch 86 is closed whereby electrical power is supplied to the network branches through the normally closed contacts of the limit switch 81. As stated above, the cooperation of cam 44 with the actuator 40a has served to open the normally closed contacts of switch 40. Since the contacts of switch 48 are normally closed, three-way solenoid valve 17 will be energized to vent the upper pressure motor chamber 10 through lines 26, 25 and vent outlet 21, as shown by the dashed arrows in FIG. 2. The gas pressure in chambers 2 and 11 will then be greater than the pressure in chamber 10 and consequently diaphragm 12, stem 31, and valve member 7 will be moved upwardly to a partly opened low-fire position. The upward movement of stem 31 causes the U-shaped member 43 to be pivoted upwardly about shaft 42 (by means of pin 67 extending radially outwardly from sleeve 66 mounted upon stem 31) until cam 44 is raised from the actuator 40a of switch 40 to close the contacts thereof. The two-way solenoid valve 18 will then be energized and closed to trap the air in the upper pressure motor chamber 10, thus preventing further upward movement of the diaphragm 12 from its low fire position and valve member 7 from its partly opened state.

The gas burner will then be fed with fuel gas at a given rate until the stack temperature reaches the predetermined value, whereupon stack switch 85 will be opened and the two-way solenoid valve 18 will be de-energized to again vent the upper chamber 10 and thus permit further upward movement of the diaphragm 12 and further opening of valve member 7 from its seat.

As the diaphragm 12 (and valve member 7 connected thereto) move upwardly, the U-shaped member 43 will be pivoted upwardly in the counter-clockwise direction until cams 44 and 45 contact the switch operating members 47a and 48a, respectively, to close switch 47 and open switch 48. Gas will again be trapped in the upper diaphragm chamber 10 and the diaphragm 12 will be locked in the high-fire position and valve member 7 will be in its fully opened state. Fuel gas will then flow through valve body 1 at the maximum rate, and the boiler water will be heated.

As the steam pressure in boiler line 55a increases, diaphragm 52 will be flexed to the right to pivot the floating switch control rod 46a in the clockwise direction to lower the floating switches 47 and 48 relative to the stem 31, the U-shaped member 43, and the cams 47 and 48 secured thereto. As the floating switches 47 and 48 move downwardly relative to cams 44 and 45, respectively, due to the cooperation between the cam surface and the switch operator 47a the switch 47 will be opened (with switch 48 remaining open) and both solenoid valves will be de-energized to effect equalization of pressure in pressure motor chambers 10 and 11 whereby diaphragm 12 will be caused to drop downwardly to progressively close the valve member upon its seat. The diaphragm 12 will continue to drop until cam 44 again engages switch actuator 47a to close contacts of switch 47 to energize solenoid valve 18 and trap gas in the pressure motor upper chamber 10. A continued increase in boiler pressure will therefor continue to close the valve (with the U-shaped element 43 generally following the downward movement of the carrier 46 due to dropping of diaphragm 12, stem 31 and pin 67) until the switches are in their lowermost position. Cam 44 will have again caused closing of the contacts of switch 47 and energization of solenoid valve 18. The valve will remain at this partially open position until the limit control switch 81 is satisfied, whereupon the switch contacts will open to completely de-energize both the two-way and the three-way valve.

Upward pivotal movement of the switch carrier 46 upon decrease of pressure in the line 55 (and in chamber 53) will cause switch 48 to be closed and switch 47 to be opened by the cams 45 and 44, respectively, whereby upper pressure motor chamber 10 will again be vented to cause upward movement of the diaphragm and opening of the valve member 7 from its seat. The diaphragm will continue to move upwardly and to pivot U-shaped element 43 upwardly in the counter-clockwise direction until the high point of cam 44 comes into contact with the actuator 47a of switch 47 to close the same. Two-way solenoid valve 18 will then be energized to trap the gas in chamber 10 to prevent further upward movement of the diaphragm 12.

A continued increase in boiler pressure will therefore serve to close valve member 7 upon its seat 6 until the floating switches 47 and 48 reach their lowermost positions. The valve will remain at this degree of opening (provided the boiler pressure does not drop) until the limit control switch 81 is opened whereupon both the two-way and the three-way solenoid valves will be de-energized to cause complete closing of the valve.

Thus it is apparent that as the boiler pressure increases or decreases at any time during the cycle the valve will open or close proportionately.

The minimum opening position of the valve is controlled by the initial vertical position of sleeve 66 and pin 67 on stem 31 as set by the adjusting nut 65.

Instead of floating the switches 47 and 48 as a function of the pressure of the heated fluid, the floating switch carrier 46 may be adjusted in accordance with the temperature of the fluid as shown in FIG. 4. The bi-metallic element 90 mounted within the heated fluid conduit 91 is connected to the free end of floating switch control rod 56' by means of the flexible connector 92 slidably mounted within the flexible outer sleeve 93. Thus as the bi-metallic element 90 is flexibly distorted due to the difference of the heat coefficient of expansion of the two metals, connector 92 and rod 56' will be displaced longitudinally to pivotally raise or lower the floating switch carrier 46. The operation of the valve will otherwise be identical to that described with regard to the embodiment of FIGS. 1 and 2.

The temperature or pressure responsive floating switch means described above with regard to a single-diaphragm pressure motor operated valve are also applicable for use with the hydromotor operated valve of FIG. 5.

As shown in FIG. 5, the valve body 201 has an inlet opening 202 and an outlet opening 203 connected in series in the gas supply conduit 204 leading to the burner unit of the boiler furnace 205. The valve body 201 has a transverse wall 206 therein defining an inlet chamber 207 and an outlet chamber 208, which wall 206 contains an opening in which is mounted the valve seat 209. Slidably mounted within the valve seat opening is the perforated valve sleeve 210 having a resilient washer 210a adapted to be seated upon the valve seat 209 when the valve is in the closed position to prevent flow of the fluid fuel from the valve inlet chamber 207 to the outlet chamber 208. The valve sleeve 210 is carried on a valve stem 211 which slidably extends through an opening in the upper portion of the valve body bonnet 213, said opening being sealed by the fluid seal 212. At its lower end, the valve stem 211 slidably extends through seal 214 mounted in the valve body bottom plate 216 and terminates in an enlarged portion 211a within the flexible bellows 215 adjacent the rigid bottom portion 215a thereof.

The bellows 215 is mounted within the fluid tight seal to the horizontal plate 216. Surrounding the pressure chamber 217 and secured to the plate 216 is the housing 218 which contains a quantity of fluid 219, such as oil, therein. Submerged within the fluid 219 is the electrically-driven pump 220 having a pressure outlet line 221 provided with a pressure relief valve 222. A branch line 223 extends from the pressure line 221 and has an electrically-operated solenoid valve 224 connected in series therewith. Solenoid valve 224 is open in its normally de-energized state and is closed in its energized state. The branch line 223 terminates within the pressure chamber housing 217 so that when the solenoid valve 224 is open, fluid under pressure may be pumped by pump 220 through lines 220 through lines 221 and 223 into the pressure chamber housing 217 to compress the flexible bellows 215 and cause upward movement of the valve stem 211 and raising of the valve sleeves 210 from its seat 209 as will be described in greater detail below. Spring 260 provided on the valve stem normally biases the valve stem 211 and sleeve 210 downwardly to seat the washer 210a upon the seat 209.

To the upper end of the valve bonnet 213 is secured the switch housing 130 having a guide bearing 227 in the upper wall thereof through which the upper portion 211a of valve stem 211 slidably extends. Adjusting nut 165 is threadably mounted on the valve stem upper portion 211a and will be displaced longitudinally of the valve stem by rotation relative thereto. The adjusting nut supports the sleeve 166 which is keyed to the valve stem and is freely displaceable longitudinally of the valve stem.

At one end the furnace air doors operating arm 134 is pivotally connected to the fixed pivot 230 secured to the switch housing by the rigid bracket 231, and intermediate its ends the arm 134 is pivotally connected to the upper extremity of the valve stem extension 211a by the pivot 232. At its other end the arm 134 is connected to the furnace air doors 233 by the chain 234. Thus upward movement of the valve stem 211 will result in opening of the furnace air doors 233 and downward movement of the valve stem will cause closing of the doors.

In the same manner as in the embodiment of FIG. 1 a pair of micro-switches 147, 148 having switch actuators 147a, 148a are carried as a "floating unit" by the arm portion 146a of the floating switch carrier element 146. The carrier element is rotatably mounted upon the cylindrical transverse portion of the U-shaped switch operator member 143 having legs 1434a and 143b to the free extremities of which are secured the cam elements 144 and 145, respectively. Secured to an opening in the switch casing 130 is the tubular element 150 connected to the diaphragm housing 151. The pressure chamber on one side of the diaphragm is connected to a fluid pressure line of the boiler system by the conduit 155. Slidably mounted within the tubular element 150 is the floating switch carrier position control rod 156 which is secured at one end to the diaphragm and is pivotally connected at the other end to a radial projection 146c of the transverse portion of the floating switch carrier element 146.

When the fluid pressure in line 155a is relatively low, the control rod 156 will be biased to the left by spring means (not shown) to pivot carrier element 146 in the counterclockwise direction about the cylindrical transverse portion of the U-shaped member 143, whereby switches 147, 148 will be raised to the elevated position shown. As the pressure in lines 155a and 155 builds up, the diaphragm will flex to the right to longitudinally displace position control rod 156 to the right to pivot the floating switch carrier 146 in the clockwise direction to lower the floating switches 147 and 148. Since carrier 146 is freely rotatable upon the cylindrical transverse portion of U-shaped member 143, longitudinal movement of position control rod 156 and corresponding pivotal movement of carrier 146 will not affect the angular position of the U-shaped member 143.

The sleeve 166 supported by adjusting nut 165 has a pin extending radially outwardly therefrom beneath the arm 143b of the U-shaped element 143. As will be explained in detail below, as valve member 210 and valve stem 211 move upwardly, the radial pin will cooperate with the lower surface of arm 143b to move the U-shaped member upwardly to cause cams 144 and 145 to actuate switch operators 147a, 148a. Similarly, downward movement of stem 211 will result in downward pivotal movement of the U-shaped member 143.

The operation of the two-stage hydromotor valve may now be described with reference to the circuit diagram of FIG. 6, the physical locations of the temperature responsive stack switch 185 and the pressure-responsive limit and high-fire switches having been illustrated diagrammatically in FIG. 5.

When the hydromotor valve is in the closed position of FIG. 5 and the line switch 253 is closed, current will flow to pump 220 through the normally-closed contacts of the limit pressure switch 181 and through the normally-closed contacts of switch 148. Upon energization, pump 220 will pump fluid 219 through conduits 221 and 223 and through the normally open solenoid valve 224 into the pressure chamber housing 217. As the fluid pressure in housing 217 builds up, flexible bellows 215 will be compressed and valve stem 211 will be moved upwardly to partially raise valve sleeve 210 from its seat 208. Fuel will then be fed at a relatively low rate to the burners of boiler furnace 205 through the valve body 1 and the conduit 204.

As the valve stem 211 moves upwardly to the low-fire partially-open position, operator 143 is pivoted upwardly by the radial pin on sleeve 166 until switch 147 is operated by contact cam 144 upon the actuator 147a so that the contacts of switch 147 are closed. Solenoid valve 224 will then be energized by current flowing through the line containing the stack switch 185 and the solenoid valve will be actuated to its closed position. Thus no more fluid 219 may be pumped through conduit 223 into the pressure chamber housing 217 and the valve stem 211 will be maintained at its low fire position. In a similar manner, the contacts of switch 148 will be caused to open due to the cooperation between cam 145 and actuator 148a. The contacts of switch 148 are maintained open during both low and high fire positions of the valve stem 211. The pump 220, of course, will continue to operate (due to the jumper connection through the high-fire switch 199) and the pressure fluid therefrom will pass through conduit 221 and pressure relief valve 222 for recirculation.

After the chimney has been heated sufficiently to create the desired draft therethrough, stack switch 185 will be opened and the solenoid valve 224 will be de-energized to open the passage through branch line 223 so that more fluid will be pumped into the pressure chamber housing 217. The bellows 215 will then be further compressed and valve stem 211 will be raised to fully lift valve sleeve 210 to its high fire position. The fuel fluid will then flow at a relatively high rate through conduit 204 to the burners of furnace 205. The upward travel of the valve stem 211 and the degree of complete opening of the valve is limited by the compression of springs 260 and 261 mounted upon the valve stem.

After the high fire demand has been satisfied, the high-fire pressure switch 199 is operated to the "off" position and the pump 220 becomes de-energized to discontinue the flow of fluid into pressure chamber 217. Fluid will then flow out of chamber 217 through branch 223 until the valve stem 211 (and the valve sleeve 210a secured thereto) fall under the biasing force of spring 260 to the low fire position. At this point, however, the cam 144 will again engage switch actuator 147a to close the contacts of switch 147 to energize the solenoid valve 224 and prevent further outflow from the pressure chamber housing 217 and consequently the valve stem 211 will be positively maintained at its low fire position. Upon reactivation of the high-fire pressure switch upon demand for more heat, pump 220 will again be energized (by current flowing through the high-fire pressure switch) and solenoid valve 224 will be de-energized to permit pumping of additional fluid into housing 217 whereby the valve stem 211 will again be raised to its high-fire position. Thus it is apparent that the contacts of switch 147 are closed by cam 144 only when the valve stem 211 is at the low-fire position. The contacts of switch 148 are maintained open by the cam 145 once the valve stem 211 has initially raised from the valve-closed position.

Upon operation of the limit pressure switch 181 with the valve stem 211 (and the valve sleeve 210 carried thereon) in either the low or high-fire positions, both the pump 220 and the solenoid valve 224 will be de-energized with the result that fluid will flow out of pressure chamber housing 217 and valve stem 211 will drop to its fully closed position to seat valve sleeve washer 210a upon its seat.

It should be mentioned that the low-fire degree of partial opening of the valve member relative to its seat may be adjusted as desired by means of the adjusting nut 165. Rotation of the adjusting nut 165 in one direction will cause raising of sleeve 166 relative to the valve stem 211, and rotation of the adjusting nut 165 in the opposite direction will cause lowering of sleeve 165, whereby the point of cooperation between operator cam 144 with actuator 147a—and consequently the degree of opening of the valve at low-fire—may be determined.

Of course, as will be described in detail below, the low-fire position is also automatically adjusted as a function of the pressure in line 155a by means of the axial displacement of floating switch carrier position control rod 156.

When the system is in the high-fire state with the pump 220 de-energized, as the steam pressure in boiler line 155a increases, the diaphragm in housing 151 will be flexed to the right to pivot the floating switch control rod 146a in the clockwise direction to lower the floating switches 147, 148 relative to stem 211, the U-shaped member 143, and the cams 144, 145 carried thereby. As the floating switches 147, 184 move downwardly relative to cams 144, 145 respectively, the switch 147 will be opened to de-energize solenoid valve 224 whereby flow of fluid from chamber 217 will be permitted. Spring 261 will then expand to move valve system 211 downwardly to progressively move valve member 210 in the closing direction. This downward movement of valve stem 211 continues until the U-shaped operator 143 has pivoted downwardly to the point to cause cam 144 to close the contacts of switch 147 to energize solenoid valve 224, whereby the fluid will be trapped in chamber 217 to prevent further expansion of bellows 215.

If on the other hand, the steam pressure in boiler line 155a decreases, the control rod 146a will be displaced to the left to raise the floating switches 147, 184. Assuming that the high-fire pressure switch has been operated to cause energization of the pump 224, the opening of switch contacts 147 due to upward movement of the switch relative to cam 144 will cause de-energization of solenoid valve 224 whereby fluid will be pumped into chamber 217 to move valve stem 211 and valve member 210 upwardly to increase the flow of fuel to the boiler through conduit 204. It is now apparent that the control of the position of the floating switches 147, 148 as a function of the pressure in conduit 155a achieves a smooth progressive opening or closing of the valve member 210 relative to its seat and also an automatic regulation of the low-fire valve opening position.

It is obvious, of course, that the floating switch means of FIG. 5 could equally well be operable by temperature responsive means in accordance with the embodiment of FIG. 4.

While in accordance with the patent statutes I have illustrated and described the best forms and embodiments of my invention now known to me, it will be apparent to those skilled in the art that other changes may be made in the apparatus described without deviating from the scope of the invention set forth in the following claims.

I claim:

1. In a two-stage valve control means adapted to be connected in series in the gas supply main of the burner of a fluid heating furnace, said two-stage valve control means including a valve body having an inlet chamber and an outlet chamber divided by a transverse wall having a valve seat mounted therein, a valve member in said inlet chamber adapted to be seated on said valve seat to close the passage between said inlet and outlet chambers, a pressure motor having a housing divided into an upper chamber and a lower chamber by a flexible diaphragm mounted therein, said lower chamber being in communication with said valve body inlet chamber and said diaphragm being connected to the valve member therein, and means for controlling the position of said diaphragm within its housing comprising a conduit connecting said lower chamber with said upper chamber, a three-way solenoid valve having an inlet and a first outlet connected in series in said conduit, a two-way solenoid valve having an inlet and an outlet connected in series in said conduit intermediate said three-way solenoid valve and said upper chamber, said three-way solenoid valve having a second outlet vented to atmosphere, said three-way valve and said two-way solenoid valve each having solenoid-operated plunger means so arranged that when both said solenoid valves are in the de-energized state the second outlet of said three-way solenoid valve will be closed, said two-way solenoid valve will be open, and the pressure in the upper and lower diaphragm chambers will be equalized through said conduit connecting said lower chamber to said upper chamber, first switch means for energizing said three-way solenoid to actuate the plunger thereof to close said three-way valve inlet and to connect said three-way valve outlets so that the pressure in said upper chamber is vented through said two-way solenoid valve and through the outlets of said three-way valve when the two-way valve is de-energized, thus causing upward movement of the diaphragm and opening of the valve member from its seat due to the gas pressure in the valve inlet chamber, and second switch means for energizing said two-way valve to close the passage between the inlet and the outlet of said two-way valve and thus trap gas in said upper pressure motor chamber to prevent upward movement of the diaphragm and further opening of the valve member from its seat; the improvement wherein said control means further includes floating means operable in accordance with the sense and magnitude of a variation of a heat condition of the fluid heated by the furnace from a predetermined value to operate said first and second switch means to vent the pressure motor upper chamber when the heat condition of the fluid changes in one sense, thus causing raising of the valve member from its seat, and for de-energizing said two-way and three-way solenoid valves when the heat condition of the fluid changes in the opposite sense to cause downward movement of the diaphragm and corresponding movement of the valve member in the closing direction toward its seat.

2. Apparatus as defined in claim 1 wherein said floating means includes a floating switch carrier pivotally connected to the pressure motor housing, said first and second switch means each including switches mounted on said switch carrier, means for pivotally raising said switch carrier in response to changes in the heat condition of the heated fluid in said one sense and for pivotally lowering said switch carrier in response to changes in the heat condition of the heated fluid in the opposite sense, a switch operating member pivotally connected to said pressure motor housing adjacent said switch carrier, means for raising and lowering said switch operating member in accordance with the movement of the diaphragm in said pressure motor housing, said switch operating member having surfaces thereon adapted to engage the switches of the first and second switch means on the carrier to operate the contacts thereof.

3. Apparatus as defined in claim 2 wherein said floating means for operating said first and second switch means is responsive to the pressure of the heated fluid, said switch carrier being pivoted downwardly upon increase in heated fluid pressure and upwardly upon decrease in heated fluid pressure.

4. Apparatus as defined in claim 2 wherein said floating means for operating said first and second switch means is responsive to the temperature of the heated fluid, said switch carrier being pivoted downwardly upon increase in temperature of the heated fluid and upwardly upon decrease in temperature of the heated fluid.

5. Apparatus as defined in claim 2 wherein said means for raising and lowering said switch operating member in accordance with the movement of the diaphragm in said pressure motor housing comprises a stem slidably extending through an opening in the upper portion of the pressure motor housing, the lower extremity of said stem being in engagement with the diaphragm, and a pin connected to the upper portion of the stem external of the pressure motor housing, said pin being in engagement with said switch operating member.

6. Apparatus as defined in claim 5 wherein said pin is vertically adjustable on said stem.

7. Apparatus as defined in claim 3 wherein said means for pivoting said switch carrier includes a control rod slidably connected to the pressure motor housing, one end of said control rod being pivotally connected to said switch carrier, and auxiliary diaphragm means externally secured to said pressure motor housing, said diaphragm means being movable in accordance with the pressure of the heated fluid, the other end of said control rod being connected to said auxiliary diaphragm means so that movement of said auxiliary diaphragm means will cause longitudinal movement of said control rod and pivotal movement of said switch carrier.

8. Apparatus as defined in claim 4 wherein said means for pivoting said switch carrier includes a control rod slidably connected to the pressure motor housing, one end of said control rod being pivotally connected to said switch carrier, and bi-metallic temperature responsive means operable in accordance with the temperature of the heated fluid, the other end of said control rod being connected to said bi-metallic temperature responsive means so that deflection of said bi-metallic means will cause longitudinal movement of said control rod and pivotal movement of said switch carrier.

9. In a two-stage valve control means adapted to be connected in series in the gas supply main of the burner of a fluid heating furnace, said two-stage valve control means including a valve body having an inlet chamber and an outlet chamber divided by a transverse wall having a valve seat mounted therein, a valve member in said inlet chamber adapted to be seated on said valve seat to close the passage between said inlet and outlet chambers, and hydromotor means connected to said valve member for raising said valve member to a first partially-open low-fire position relative to said seat and for subsequently further raising said valve member to a second substantially fully-open high-fire position relative to said seat; the improvement which comprises a floating switch carrier pivotally movable about a horizontal pivot axis which is fixed relative to said valve body, said hydromotor means including low-fire switch means operable to maintain said valve member in a low-fire position relative to its seat, said low-fire switch means being secured to said floating switch carrier for movement therewith, means pivotally raising said switch carrier relative to said valve seat in response to changes in the heat condition of the heated fluid in one sense and for pivotally lowering said switch carrier in response to changes of the heated fluid in the opposite sense, a switch operating member adjacent said switch carrier and pivotally movable about a horizontal pivot axis which is fixed relative to said valve body, and means for pivotally moving said switch operating member in accordance with the movement of said valve member relative to its seat to operate said low-fire switch means and thus maintain said valve member in a low-fire position, the defined combination being further characterized in that said hydromotor means comprises a bellows chamber connected to said valve body, a flexible bellows secured in said chamber and connected to said valve member, a container of hydraulic fluid, a conduit in communication at one end with said bellows chamber, pump means connected to said conduit for pumping said hydraulic fluid into said chamber through said conduit to flex said bellows to move said valve member relative to said seat, and solenoid valve means connected in said conduit intermediate said pump and said chamber, said solenoid valve means being operable by said low-fire switch means to control the passage of hydraulic fluid through said conduit.

10. Apparatus as defined in claim 9 wherein said solenoid valve means is open in its de-energized condition and further wherein the contacts of said low-fire switch are normally open, the contacts of said low-fire switch being closed by said switch operator to energize said solenoid valve when said valve member is in a partially open low-fire position relative to its seat.

11. Apparatus as defined in claim 10 wherein said floating switch carrier and said switch operator are independently movable about a common pivot axis, and further wherein said means for pivotally displacing said switch carrier comprises pressure responsive means responsive to the pressure of the heated fluid.

References Cited in the file of this patent
UNITED STATES PATENTS

| | | |
|---|---|---|
| 1,937,929 | Williams et al. | Dec. 5, 1933 |
| 2,329,682 | Alfrey | Sept. 14, 1943 |
| 2,597,032 | Ray | May 20, 1952 |
| 2,812,909 | Dalton | Nov. 12, 1957 |
| 2,825,510 | Sullivan | Mar. 4, 1958 |

FOREIGN PATENTS

| | | |
|---|---|---|
| 757,055 | Germany | Apr. 10, 1952 |